Jan. 22, 1957 W. KUHLMANN ET AL 2,778,220
DEVICE FOR MEASURING THE VISCOSITY OF LIQUIDS
Filed Aug. 7, 1953 2 Sheets-Sheet 1

Inventors.
Wilhelm Kuhlmann &
Georg Hahn.
By [signature] Atty.

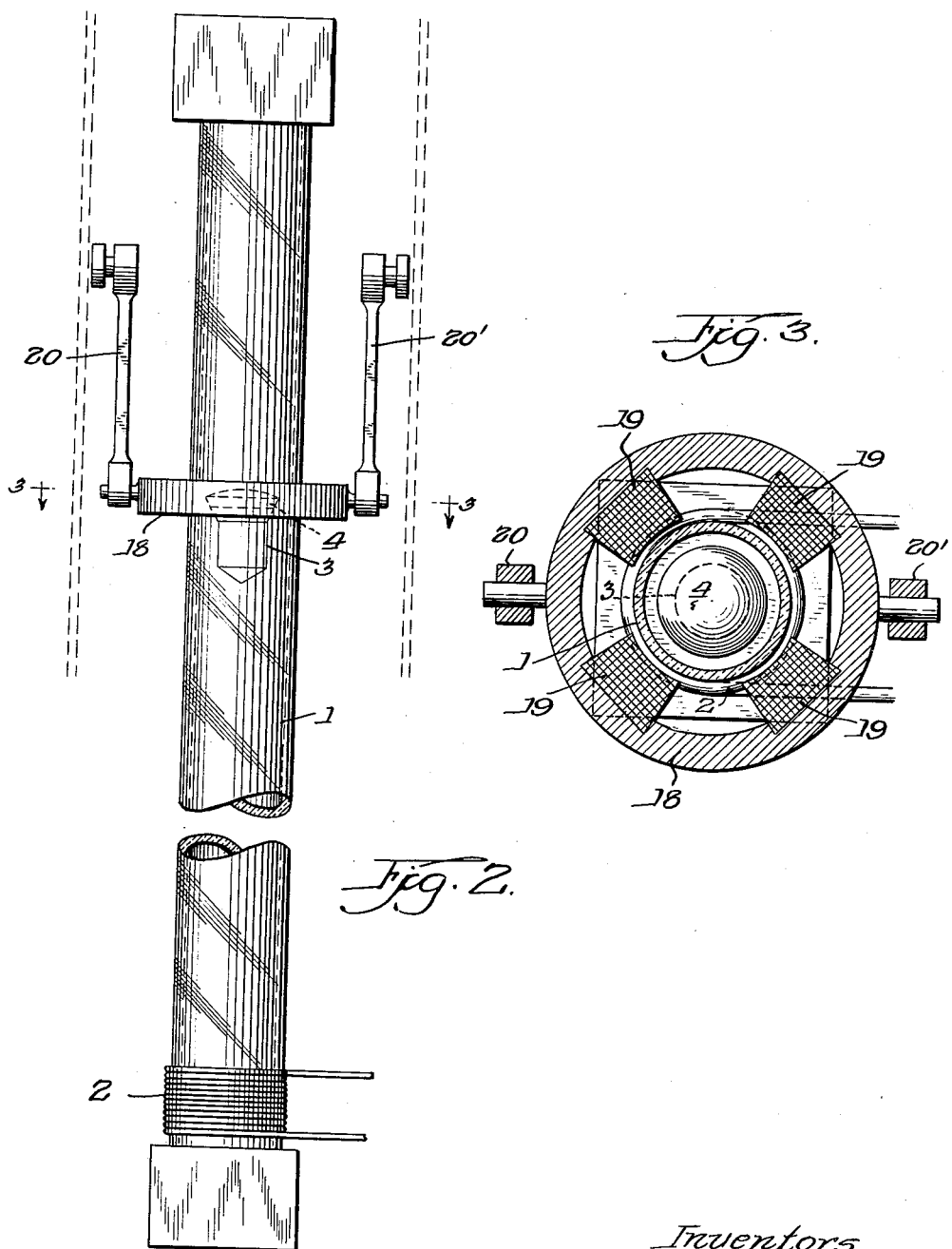

ically of the record strip. When the iron ring of the falling drop body passes through the field of the solenoid coil at the bottom of the glass cylinder, a magnet is actuated to press the stylus of the time recording instrument against the record strip to impress a mark thereon. The motor thereupon lowers the magnet to attract the fallen drop body which is thereupon lifted to position it for subsequent free fall through another portion of liquid admitted into the glass cylinder by the opening of the inlet and outlet valves. The device is now ready to take another viscosity measurement.

United States Patent Office 2,778,220
Patented Jan. 22, 1957

2,778,220

DEVICE FOR MEASURING THE VISCOSITY OF LIQUIDS

Wilhelm Kuhlmann and Georg Hahn, Duisburg, Germany, assignors to Brabender O. H., Duisburg, Germany, a firm Application August 7, 1953, Serial No. 372,874

Claims priority, application Germany August 21, 1952

7 Claims. (Cl. 73—57)

The present invention relates to a device for measuring the viscosity of a liquid by means of a body dropping in the liquid, the dropping time of the body being measured to indicate the viscosity of the liquid.

It is an object of the invention to record automatically the time of fall of a drop body of a given specific gravity falling freely through a liquid whose viscosity is to be measured. For this purpose, a vertically disposed cylindrical measuring receptacle, having a solenoid coil wound about its lower end, has disposed therein a drop body which is freely movable inside thereof, the drop body being provided with an iron ring. The receptacle contains the liquid, the viscosity of which is to be measured. The stylus of a time recording instrument is moved transverse of a record strip as soon as the drop body begins to fall through the liquid and is stopped as soon as the iron ring of the drop body enters the field of the solenoid, thereby producing an impulse for the operation of a magnet to cause the stylus to imprint a mark on the record strip.

To facilitate the lifting of the drop body inside the tubular receptacle, which may be a glass cylinder, an electric motor is provided which respectively lifts and lowers link means extending downwardly into the cylinder, the link means carrying at the lower end thereof a permanent magnet which can thus be moved through substantially the whole length of the cylinder. The head of the drop body carries a small iron member which is attracted by the permanent magnet in its lowermost position so as to lift the drop body within the glass cylinder into its start position incident to subsequent lifting of the link means.

Alternatively, the lifting of the drop body may be effected by means of an iron ring surrounding the glass cylinder and carrying permanent magnets. The lifting and lowering of the drop body by means of the permanent magnets secured to the iron ring is likewise effected by means of link means operated by an electric motor.

Liquids often have viscosities differing widely from one another, and it is therefore proposed to make the drop body hollow and to provide it with a filling opening, having closure means, whereby the drop body may be filled with liquids of different specific gravity. A single drop body can thus be used for measuring liquids with different viscosities.

Another object of the invention is to provide a device operating in the above indicated manner and adapted to afford continuous measuring of the viscosity of liquids produced or used in the course of a production process. For this purpose, the vertical glass cylinder is disposed parallel to a pipeline carrying the liquid to be examined, and is connected therewith by means of inlet and outlet valves which are preferably controlled magnetically.

By means of the device according to the invention, the viscosity of a liquid flowing in a pipeline can be measured in the following manner: Upon lifting the drop body disposed in the glass cylinder, the valves are opened so that the liquid to be examined can flow from the pipeline through the glass cylinder. The drop body is detached from the magnet shortly before the top dead center of the lifting linkage is reached and at the same instant a mercury switch is tripped to cause travel of the stylus of the time recording instrument transversally of the record strip. When the iron ring of the falling drop body passes through the field of the solenoid coil at the bottom of the glass cylinder, a magnet is actuated to press the stylus of the time recording instrument against the record strip to impress a mark thereon. The motor thereupon lowers the magnet to attract the fallen drop body which is thereupon lifted to position it for subsequent free fall through another portion of liquid admitted into the glass cylinder by the opening of the inlet and outlet valves. The device is now ready to take another viscosity measurement.

The foregoing and other objects and features of the invention will appear from the description which will be rendered below with reference to the accompanying drawings showing preferred embodiments.

Fig. 2 shows a modification of the device shown in Fig. 1; and

Fig. 3 is a section taken along the line 3—3 of Fig. 2.

Figure 1:
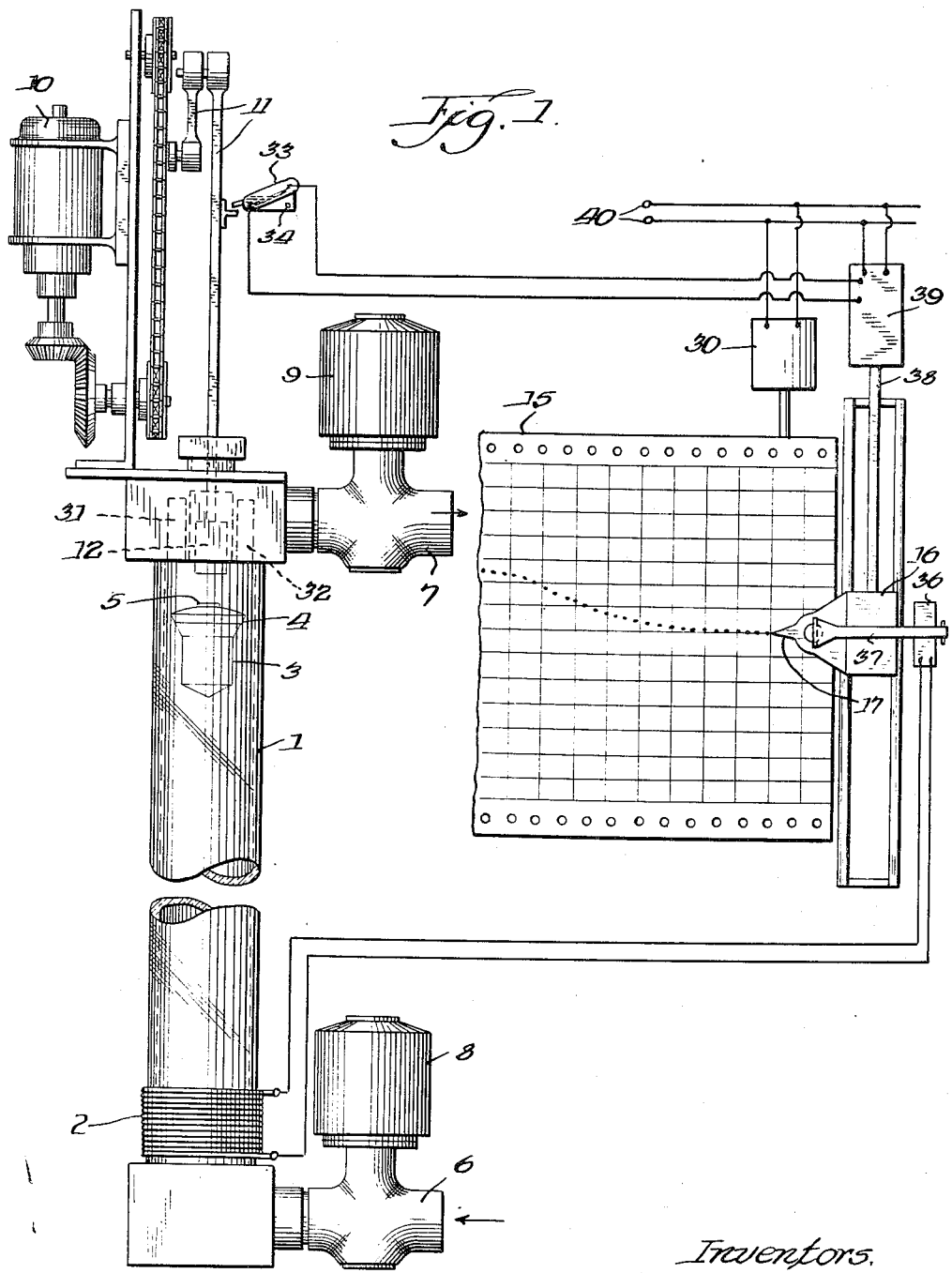
Fig. 1 is an elevational view of a viscosity measuring device according to the invention.

Referring to Fig. 1, a coil 2 surrounds the bottom end of a glass or the like cylinder 1, such coil being connected to magnet 36 adapted to operate a lever 37 for actuating the stylus 17 relative to the recording strip 15, the stylus being mounted on a slide 16 which may be moved transverse of the record strip 15 by a member 38 actuated by a suitable drive 39 connected to a current source 40. A drop body 3 is disposed inside the glass cylinder 1 and adapted to move therein, the drop body carrying at its upper end an iron ring 4 and on its head a small iron disk 5.

The glass cylinder 1 is arranged parallel to a pipeline (not shown in the drawing) carrying the liquid to be measured and connected with the glass cylinder through the inlet and outlet valves 6 and 7 respectively controlled by magnetic operating means 8 and 9. The device further comprises a motor 10 for lifting and lowering a linkage system 11 extending into the glass cylinder and carrying at its lower end a permanent magnet 12. The record strip 15 of the time recording instrument is advanced after every viscosity measuring operation by known and suitable means indicated at 30, connected to the current source 40. The recording instrument may be placed adjacent the drop body device or remote therefrom as desired.

The invention makes it possible to measure the viscosity of liquids continuously. The drop body 3 is lifted to its upper start position by the permanent magnet 12 operated by the linkage 11 which is controlled by the motor 10. Upon reaching start position, the drop body 3 is stripped from the permanent magnet by stationary members 31, 32, for free fall through the liquid in the cylinder 1; at the instant when the drop body 3 is stripped from the magnet 12, a mercury switch 33 pivotally mounted at 34, is tripped to start the drive means 39 for moving the slide 16 and therewith the stylus 17 transversally of the record strip 15. The drop body 3 falls through the liquid in the glass cylinder 1. The speed at which it falls depends on the viscosity of the liquid. Since the stylus slide 16 begins to move relative to the record strip 15 at the instant when the drop body begins to fall, the distance through which the slide moves will be proportional to the time of fall of the drop body 3, that is, the more viscous the liquid contained in the glass cylinder is, the longer will be the travel of the stylus slide 16. When the iron ring 4 of the drop body 3 enters the field of the coil 2, the stylus 16 carried by the slide 16 will have travelled a distance corresponding to the falling time of the body 3 and will be correspondingly positioned relative to the record strip 15. Passage of the iron ring 4 carried by the drop body 3 into the field of the coil 2 produces an impulse which is transmitted to the magnet 36. This magnet upon energizing actuates the lever 37 to press the stylus 17 against the record strip 15 to print a mark thereon, thus recording the falling time of the drop body as a criterion for the viscosity of the portion of the liquid that had been examined. The motor 10 and the magnetic operating means 8 and 9 are energized, by suitable means (not shown). The valves 6 and 7 are accordingly opened and the motor 10 moves the linkage 11 to lift the drop body 3, while fresh liquid enters the glass cylinder 1. Shortly before the top dead center of the linkage system 11 is reached, the magnetic operating means 8 and 9 are actuated to close the valves 6 and 7, thereby stopping the flow of the liquid into and from the cylinder 1. Another viscosity measurement can now be taken as described. The graph produced by the stylus 17 on the record strip 15 represents the degree of viscosity of portions of a continuously examined liquid.

In the structure shown in Figs. 2 and 3, the drop body 3 is lifted by means of an iron ring 18 surrounding the glass cylinder 1 sufficiently loosely so that it may be moved up and down along the wall of the glass cylinder 1. The iron ring 18 carries four permanent magnets 19.

By means of the device shown in Figs. 2 and 3, the drop body 3 is lifted in a manner similar as the correspondingly marked drop body shown in Fig. 1. The iron ring 18 is moved vertically by means of the linkage 20—20' which may be lifted and lowered by an electric motor as explained in connection with Fig. 1. The drop body 3 is raised in the glass cylinder 1 by the force of the magnets 19 acting on the iron ring 4 of the drop body incident to the lifting of the iron ring 18.

Changes may be made within the scope and spirit of the appended claims.

What we claim is:

1. A device for periodically automatically measuring the viscosity of a liquid flowing through a pipeline comprising a vertically disposed cylindrical measuring receptacle, inlet and outlet means carried by said receptacle, valve means for periodically automatically connecting said inlet and said outlet means to said pipeline to admit successive portions of the liquid flowing therein to flow into said receptacle in parallel to the flow thereof in said pipeline, a drop body which is freely movable inside said receptacle and adapted to fall through the portion of said liquid admitted thereinto, means for recording the time of fall of said drop body through said liquid portion in said receptacle, a vertically movable magnet, means for moving said magnet downwardly to attract said fallen drop body and for thereafter moving it upwardly with said drop body attracted thereto to place said drop body in position for subsequent fall through another portion of liquid admitted into said receptacle.

2. The device as defined in claim 1, comprising means for detaching said drop body from said magnet to permit free fall thereof through the other portion of liquid admitted into said receptacle.

3. The device as defined in claim 1, wherein said magnet is positioned in said receptacle and movable in the liquid admitted thereinto.

4. The device as defined in claim 1, wherein said magnet is positioned exteriorly of said receptacle and movable vertically relative thereto.

5. A device for periodically automatically measuring the viscosity of a liquid flowing through a pipeline comprising a vertically disposed cylindrical measuring receptacle, inlet and outlet means carried by said receptacle, valve means for periodically automatically connecting said inlet and said outlet means to said pipeline to admit successive portions of the liquid flowing therein to flow into said receptacle in parallel to the flow thereof in said pipeline, a drop body which is freely movable inside said receptacle and adapted to fall through the portion of said liquid admitted thereinto, said drop body carrying an iron disc, a permanent magnet movable within said cylindrical receptacle, link means for respectively lowering and raising said permanent magnet, an electric motor for actuating said link means to lift said drop body after it has fallen through said liquid portion in said receptacle, and means for recording the time of fall of said drop body through said liquid portion in said receptacle.

6. A device for periodically automatically measuring the viscosity of a liquid flowing through a pipeline comprising a vertically disposed cylindrical measuring receptacle, inlet and outlet means carried by said receptacle, valve means for periodically automatically connecting said inlet and said outlet means to said pipeline to admit successive portions of the liquid flowing therein to flow into said receptacle in parallel to the flow thereof in said pipeline, a drop body which is freely movable inside said receptacle and adapted to fall through the portion of said liquid admitted thereinto, an iron ring surrounding said cylindrical receptacle and being slidable longitudinally thereof, a plurality of permanent magnets supported by said iron ring, link means for respectively raising and for lowering said iron ring with said permanent magnets, a motor for actuating said link means to lift said drop body after it has fallen through the liquid portion in said receptacle, and means for recording the time of fall of said drop body through said liquid portion in said receptacle.

7. A device for periodically automatically measuring the viscosity of a liquid flowing through a pipeline comprising a vertically disposed cylindrical measuring receptacle, inlet and outlet means carried by said receptacle, valve means for periodically automatically connecting said inlet and said outlet means to said pipeline to admit successive portions of the liquid flowing therein to flow into said receptacle in parallel to the flow thereof in said pipeline, a drop body which is freely movable inside said receptacle and adapted to fall through the portion of said liquid admitted thereinto, means for recording the time of fall of said drop body through said liquid portion in said receptacle, permanent magnet means, actuating means for lowering said permanent magnet means relative to the portion of said liquid in said cylindrical receptacle to a level attained by said drop body after it has fallen through said liquid portion so as to attract said drop body magnetically and for thereafter raising said permanent magnet means to raise said attracted drop body, said valve means being open during the raising of said drop body to admit another liquid portion into said receptacle for the measuring of the viscosity thereof, means for stripping said drop body from said permanent magnet upon raising it to a predetermined level, to allow said drop body to fall through such other liquid portion, and electromagnetic field means affected by said drop body at the end of its fall through said liquid portion for controlling said recording means.

References Cited in the file of this patent

UNITED STATES PATENTS

| | | |
|---|---|---|
| 1,780,952 | Symmes | Nov. 11, 1930 |
| 2,234,437 | Kistler | Mar. 11, 1941 |
| 2,252,572 | Lang | Aug. 12, 1941 |
| 2,491,389 | Norcross | Dec. 13, 1949 |

FOREIGN PATENTS

| | | |
|---|---|---|
| 512,835 | Germany | Nov. 18, 1930 |